Patented Oct. 12, 1943

2,331,387

UNITED STATES PATENT OFFICE 2,331,387

CONDENSATION PRODUCT AND PROCESS OF PREPARING SAME

Charles Graenacher, Riehen, Richard Sallmann, Bottmingen, and Otto Albrecht, Basel, Switzerland, assignors to the firm of Society of Chemical Industry in Basle, Basel, Switzerland No Drawing. Application January 19, 1939, Serial No. 251,850. In Switzerland January 22, 1938

14 Claims. (Cl. 260—399)

According to the present invention new condensation products are obtained by reacting a thiourea compound containing the group

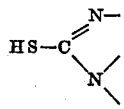

with a formaldehyde derivative of a compound which contains at least seven connected carbon atoms and corresponds to the general formula

R—X—H wherein R stands for an organic radical containing at the most 12 carbon atoms and wherein X stands for a bridge in which the sum of the atomic weights of the atoms connecting H with R in a straight chain is an even number between 26 and 32 inclusive, which chain contains the same atom at the most once, the hydrogen atom H being bound to an atom the atomic weight of which amounts to at least 14.

As thiourea compound containing the group

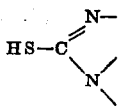

may be used thiourea, N-methyl-, N:N'-dimethyl-, N:N:N'-trimethylthiourea, N-monoethylthiourea, N-phenylthiourea, N:N'-diethylthiourea, potassium N-phenylthiourea-parasulfonate, sym.-diethyloxythiourea $(C_2H_5-NH-CS-N(C_2H_5)OH)$ monothiobiuret $(NH_2-CO-NH-CS-NH_2)$, allophanic acid methyl ester

or the like.

Quite generally may be used thiourea compounds of the formula

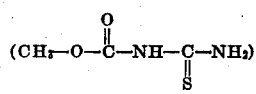

wherein $R_1$, $R_2$ and $R_3$ represent alkyl, aryl, aralkyl radicals, substituted alkyl radicals or alkyl radicals interrupted by other atoms such as O, S, N, or substituted aryl radicals. These products of the indicated formula

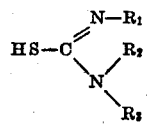

are also designated as "pseudo-thioureas". A radical such as

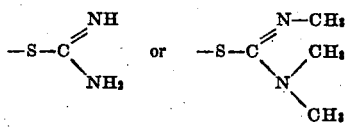

is therefore designated in the present specification as "a radical of a pseudo-thiourea compound."

As an example of a compound of the above mentioned general formula

R—X—H wherein R stands for an organic radical containing at the most 12 carbon atoms of which at least 7 are connected, and wherein X represents a bridge in which the sum of the atomic weights of the atoms connecting R with H in a straight chain is an even number between 26 and 32 inclusive, which chain contains the same atom at the most once, there may be mentioned the lauric acid amide of the formula

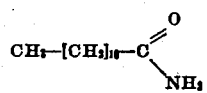

In this case R stands for $CH_3-[CH_2]_{10}-$ and X stands for

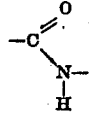

H being connected with R in a straight chain by

and the sum of the atomic weights of these atoms amounting to 26. The bridge X may also represent

in which case the sum of the atomic weights of the atoms connecting H with R in a straight chain amounts to 12+16=28. Finally, the bridge X can also be formed by a sulfur atom (atomic weight=32). In all these cases the same atom (C, O, N, S) exists at the most once in the straight chain, connecting H with R; further the hydrogen atom H in the cited general formula

is always linked to an atom the atomic weight of which amounts to at least 14 (N, O or S).

In the above cited general formula

R represents quite generally an organic radical containing at the most 12 carbon atoms. If in this formula X represents a sulfur atom, R contains a carbon chain formed by at least seven connected carbon atoms. If the bridge X itself contains a carbon atom

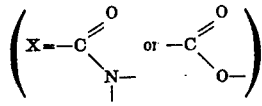

R need contain only six carbon atoms forming with the carbon atom of the bridge X a non-interrupted carbon chain. The cited radical R may be for example a hydrocarbon radical belonging to the aliphatic, cycloaliphatic, mixed aliphatic-cycloaliphatic, aromatic, mixed aliphatic-aromatic or heterocyclic series. The carbon chain of the radical R may also be interrupted once or as the case may be repeatedly by heteroatoms, such as O, S, N, or by groups, such as

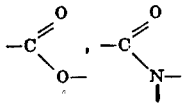

In the following are cited numerous examples of compounds of the indicated formula

which further illustrate the significance of R.

Formaldehyde derivatives of compounds of the cited general formula

are for example methylol compounds of carboxylic acid amides, N-halogenmethyl carboxylic acid amides, N-halogenmethyl carboxylic acid esters or chloromethyl thioethers. Corresponding formaldehyde derivatives of ureas of high molecular weight or urethanes come also into consideration.

As carboxylic acid methylolamides there may be used, for instance, the methylolamides of caprylic, capric, lauric, benzoic, toluic, para-hexylbenzoic, hexahydrobenzoic acid. These N-methylolcarboxylic acid amides, insofar as they have not been described, are accessible without further information by processes analogous to those that are known.

As methylol compounds of urethanes there may be used, for instance, the N-methylol compounds obtainable from the urethanes corresponding with the aliphatic alcohols having 3–13 carbon atoms by treatment with formaldehyde in the usual manner.

The ureamethylol compounds which may be used as parent materials may also be made by processes analogous to those known and without further information from the corresponding ureas, for example hexyl- or octyl-urea.

As halogenmethyl carboxylic esters there may be used in the invention for example the chloromethyl esters of caprylic, capric or lauric acid. These chloromethyl esters are known and those which have not been hitherto described may be made by the process analogous to those known without further information.

As α-halogenmethyl thioethers there may be used the α-halogenmethyl sulfides which are easily obtainable from mercaptans, such as dodecylmercaptan, in known manner. The N-halogenmethyl compounds of amides applicable as parent materials, for instance lauric acid-N-methylamide, or those of carboxylic acid methylolamides, such as lauric acid methylolamide, or those from hydrazides, for instance lauric acid hydrazide, or from hydroxamic acids, such as lauryl hydroxamic acid, may be made in the usual manner with aid of para-formaldehyde and hydrogen halides, for instance hydrogen chloride.

The reaction between the cited formaldehyde derivatives and the thiourea compounds containing an

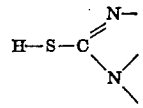

group may be effected by mixing the components at room temperature or at a raised temperature, for example 50–100° C., preferably in the presence of a solvent, for instance benzene, chloroform, carbon tetrachloride or glacial acetic acid. When a methylol compound such as a carboxylic acid-N-methylolamide is subjected to the reaction it is frequently advantageous to use a strong acid, for instance hydrochloric acid, as a condensing agent, if desired together with a diluent.

According to the present process there are generally obtained salts of products containing at least seven connected carbon atoms and corresponding to the general formula

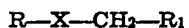

wherein R stands for an organic radical free from water-solubilizing groups and containing at the most 12 carbon atoms, X stands for a bridge in which the sum of the atomic weights of the atoms connecting $CH_2$ with R in a straight chain is an even number between 26 and 32, the straight chain containing the same atom at the most once, and wherein $R_1$ stands for the radical of a pseudo-thiourea compound the sulfur atom of which is bound to the $CH_2$-group, the latter being linked to such an atom of the bridge X the atomic weight of which amounts to at least 14, which salts are liquid to solid substances soluble in water to form solutions which are decomposed by boiling or when treated with alkalies, water-insoluble compounds being formed. As salts there come into consideration particularly the salts formed with mineral acids, such as hydrohalic acids, for example hydrochloric acid, hydrobromic acid, sulfuric acid, further the salts formed with organic acids, such as formic acid, or acetic acid. An example of such a salt is the product of the formula

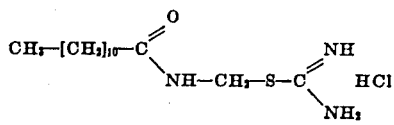

wherein the acid is bound by the pseudo-thiourea radical.

The condensation products obtainable by the invention are, in the form of the salts which they form with acids, soluble in water. The stability of the solutions thus obtained may be increased by the addition of certain auxiliary substances, for instance thioureas, ureas, capillary cation active products. As an example of the last named auxiliary products may be cited the acetate of oleyldiethylamino-ethylamide as well as the μ-hepta-decyl-N-methyl-N' - ethylbenzimidazolium chloride. These solutions, whether they contain additional materials or not, have the property that when they are heated or treated with alkalis they decompose, insoluble bodies being precipitated. When this happens on a substratum, for instance a textile, this insoluble body is precipitated in an adherent form. It may, according to its nature, impart to the fiber valuable properties. Among these may be cited a waterproofing or water-repelling character fast to washing and frequently connected with a special softness and fullness, the latter being still further enhanced by the addition of other filling agents. There may also be a strong diminution of the hygroscopic character and an increase of the insulating properties in respect of heat and electricity. As further characteristics which may be imparted to the fiber there may be named the stability to creasing and to shifting of the warp and weft, the diminution of lustre, the increase of resistance to water, the prevention of shrinkage in the fabric and in the case of wool the prevention of felting. By local application of the process there may also be obtained calendering, matting and damask effects and color effects which have their origin in the changed affinity of the fiber for dyestuffs. When the process is applied to colored textiles the characteristics of the dyeing, for instance fastness to light, fastness to rubbing, fastness to washing, fastness to water, may be essentially increased. These various effects may be additive.

By a suitable choice of the parent material the products of the invention may be useful as wetting, emulsifying, foam-producing, levelling, softening agents and as agents enhancing the fastness of dyeings to water, also as disinfectants or preservatives. For these purposes products are especially suitable which contain an aliphatic radical having about 12 carbon atoms.

When the parent materials used for the condensation are dyestuffs or intermediate products of dyestuffs it is possible to apply the new products to the fiber and then to subject them to decomposition, whereby the dyestuff or the intermediate product is fixed on the fiber, the latter being developed to dyestuff if desired.

The products of the invention may be used alone or, as already stated, in conjunction with other substances. Apart from the above-named auxiliaries (thioureas, ureas, capillary active cation products) there may be used for example salts, especially those of feeble acids, for example sodium acetate, ammonium acetate, aluminium formate, aluminium acetate, ammonium sulfocyanide, also solvents, hydrocarbons such as paraffin, wax, soaps, soap-like substances, protective colloids, dressing agents, loading materials, softening agents, matting agents or the like.

The following examples illustrate the invention, the parts being by weight:

*Example 1*

4.6 parts of lauric acid methylolamide and 3 parts of thiourea are dissolved together in 40 parts by volume of hot alcohol. After cooling to 50° C. there are added while stirring 4 parts by volume of alcoholic hydrochloric acid of 25 per cent strength, and the whole is heated for 20 minutes at 50–55° C. A sample would then be found to be clearly soluble in water with production of much foam. After distilling the alcohol in a vacuum, the product, which probably has the formula

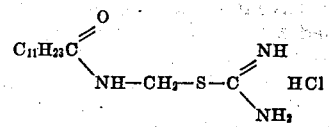

remains in the form of a semi-solid mass which decomposes when boiled in aqueous solution or on addition of alkalis with the formation of a compound insoluble in water.

*Example 2*

Into 600 parts by volume of absolute alcohol are introduced successively while stirring at 40–50° C., 200 parts of methylol benzamide, 105 parts of thiourea and a concentrated solution of 50 parts of HCl in absolute alcohol. The solution which very soon becomes clear is stirred for 1½ hours at 40–50° C., then over night at room temperature, and finally for 2 hours while cooling with ice. After filtering and drying, the new condensation product is obtained in the form of a colorless crystalline powder, having probably the formula

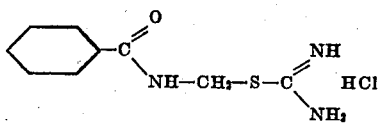

*Example 3*

Lauric acid chloride is converted in the manner known for fatty acid chlorides of low molecular weight into the chloromethyl ester; for example, 100 parts of lauric acid chloride are mixed with 13.8 parts of paraformaldehyde and 2.4 parts of anhydrous zinc chloride, and the mixture is heated while stirring for about 2 hours in a boiling water bath. 12.4 parts of the lauric acid chloromethyl ester obtainable in this manner are added at about 60° C. to a solution of 4.2 parts of thiourea in 60 parts by volume of glacial acetic acid, and the whole is heated while stirring for about 15 minutes at 60–65° C. and then for 30 minutes at 75–80° C. After cooling the precipitated condensation product is separated from the liquor, washed with a little glacial acetic acid and dried at a low temperature. This new compound probably has the formula

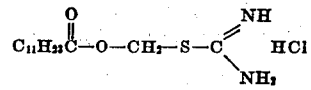

It forms a colorless powder soluble in hot water to a solution that foams when shaken and is decomposed by boiling.

Instead of the lauric acid chloromethyl ester, also the benzoic acid chloromethyl ester may be caused to react with thiourea. Further, in the above mentioned reactions the thiourea can be replaced by N-phenyl-thiourea.

*Example 4*

0.5 part of α-chloromethyldodecylthioether is dissolved in 5 parts by volume of benzene, 0.16 part of finely powdered thiourea is added and the whole is heated while rapidly stirring for one hour at 75° C. The condensation product which separates on cooling and probably has the formula

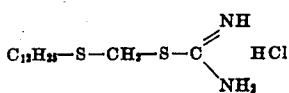

is filtered, washed with benzene and freed from adhering solvent at a low temperature. There is obtained a colorless powder which is dissolved by hot water to a clear solution which foams strongly when shaken and is decomposed when boiled.

In analogous manner, the chloromethyl thioether from benzylmercaptan or decylmercaptan may be caused to react with thiourea.

Example 5

2.3 parts of lauric acid methylolamide are dissolved in 25 parts by volume of hot alcohol and after cooling to 50° C. and while stirring, 4 parts of finely powdered N-phenylthiourea are added, followed by 2 parts by volume of alcoholic hydrochloric acid of 20 per cent strength. After stirring for 10–15 minutes at 40–50° C. a sample is soluble in water. The clear solution is evaporated at 40–50° C. in a vacuum and the condensation product having probably the formula

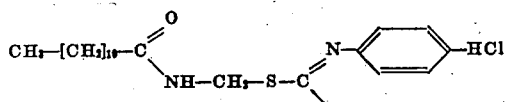

or

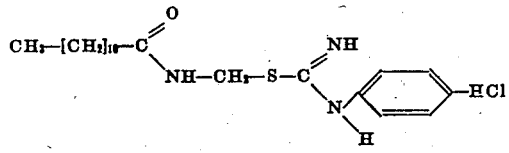

is left in the form of a mass resembling wax.

What we claim is:

1. A process for the manufacture of condensation products, which comprises condensing a thiourea compound containing the group

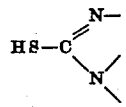

with a member of the group consisting of chloromethyl carboxylic acid esters and chloromethyl thioethers, said member containing at least 7 connected carbon atoms and at the most 13 carbon atoms.

2. A process for the manufacture of condensation products, which comprises condensing a thiourea compound containing the group

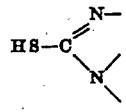

with a chloromethyl thioether which contains at least 7 connected carbon atoms and at the most 13 carbon atoms.

3. A process for the manufacture of condensation products, which comprises condensing a thiourea compound containing the group

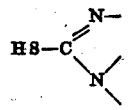

with a chloromethyl carboxylic acid ester which contains at least 7 connected carbon atoms and at the most 13 carbon atoms.

4. A process for the manufacture of condensation products, which comprises condensing a thiourea compound containing the group

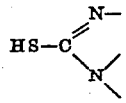

with a chloromethyl thioether containing 7–12 connected carbon atoms.

5. A process for the manufacture of condensation products, which comprises condensing a thiourea compound containing the group

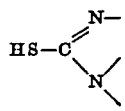

with a chloromethyl carboxylic acid ester containing 7–12 connected carbon atoms.

6. A process for the manufacture of a condensation product, which comprises condensing thiourea with the compound of the formula

7. A process for the manufacture of a condensation product, which comprises condensing thiourea with the compound of the formula

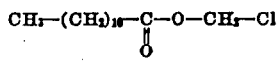

8. The salts of the products which contain at least 7 connected carbon atoms and correspond to the formula

wherein R stands for an organic radical free from water-solubilizing groups and containing at the most 12 carbon atoms, X stands for a bridge selected from the group consisting of

and —S—, R being connected to the left-hand free bond of the said bridge and the CH$_2$-group being connected to the right-hand free bond of the said bridge, as above shown, and R$_1$ stands for the radical of a pseudo-thiourea compound the sulfur atom of which is bound to the CH$_2$-group, which salts are liquid to solid substances soluble in water to form solutions which are decomposed by boiling or by treating with alkalies, water-insoluble compounds being formed.

9. The salts of the products which contain at least 7 connected carbon atoms and correspond to the formula

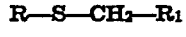

wherein R stands for an organic radical free from water-solubilizing groups and containing at the most 12 carbon atoms, and R$_1$ stands for the radical of a pseudo-thiourea compound the sulfur atom of which is bound to the CH$_2$-group, which salts are liquid to solid substances soluble in water to form solutions which are decomposed by boiling or by treating with alkalies, water-insoluble compounds being formed.

10. The salts of the products which contain at least 7 connected carbon atoms and correspond to the formula

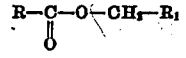

wherein R stands for an organic radical free from water-solubilizing groups and containing at the most 12 carbon atoms, and $R_1$ stands for the radical of a pseudo-thiourea compound the sulfur atom of which is bound to the $CH_2$-group, which salts are liquid to solid substances soluble in water to form solutions which are decomposed by boiling or by treating with alkalies, water-insoluble compounds being formed.

11. The salts of the products which correspond to the formula $$R-S-CH_2-R_1$$

wherein R stands for an aliphatic radical containing 7–12 connected carbon atoms, and $R_1$ stands for the radical of a pseudo-thiourea compound the sulfur atom of which is bound to the $CH_2$-group, which salts are liquid to solid substances soluble in water to form solutions which are decomposed by boiling or by treating with alkalies, water-insoluble compounds being formed.

12. The salts of the products which correspond to the formula $$R-\underset{\underset{O}{\|}}{C}-O-CH_2-R_1$$

wherein R stands for an aliphatic radical containing 7–12 connected carbon atoms, and $R_1$ stands for the radical of a pseudo-thiourea compound the sulfur atom of which is bound to the $CH_2$-group, which salts are liquid to solid substances soluble in water to form solutions which are decomposed by boiling or by treating with alkalies, water-insoluble compounds being formed.

13. The salts of the product of the formula

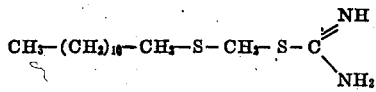

which salts are liquid to solid substances soluble in water to form solutions which are decomposed by boiling or by treating with alkalies, water-insoluble compounds being formed.

14. The salts of the product of the formula

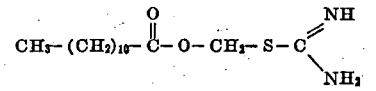

which salts are liquid to solid substances soluble in water to form solutions which are decomposed by boiling or by treating with alkalies, water-insoluble compounds being formed.

CHARLES GRAENACHER.
RICHARD SALLMANN.
OTTO ALBRECHT.